Aug. 20, 1935.    G. W. BEHNKE    2,012,155
DISINTEGRATING MACHINE
Filed Jan. 9, 1932    2 Sheets-Sheet 1
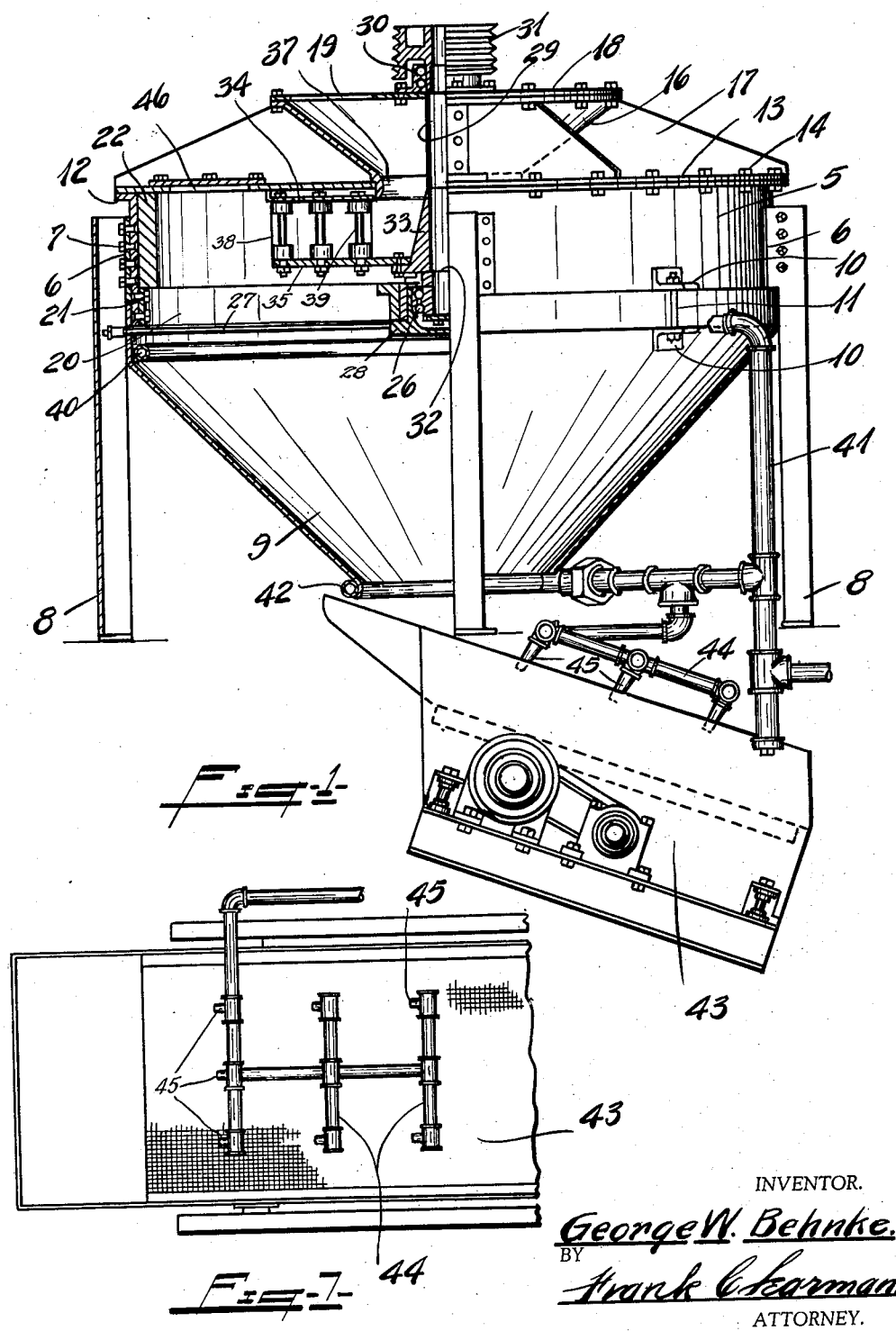
INVENTOR.
George W. Behnke.
BY
Frank C. Fearman.
ATTORNEY.

Aug. 20, 1935.        G. W. BEHNKE        2,012,155
DISINTEGRATING MACHINE
Filed Jan. 9, 1932        2 Sheets-Sheet 2
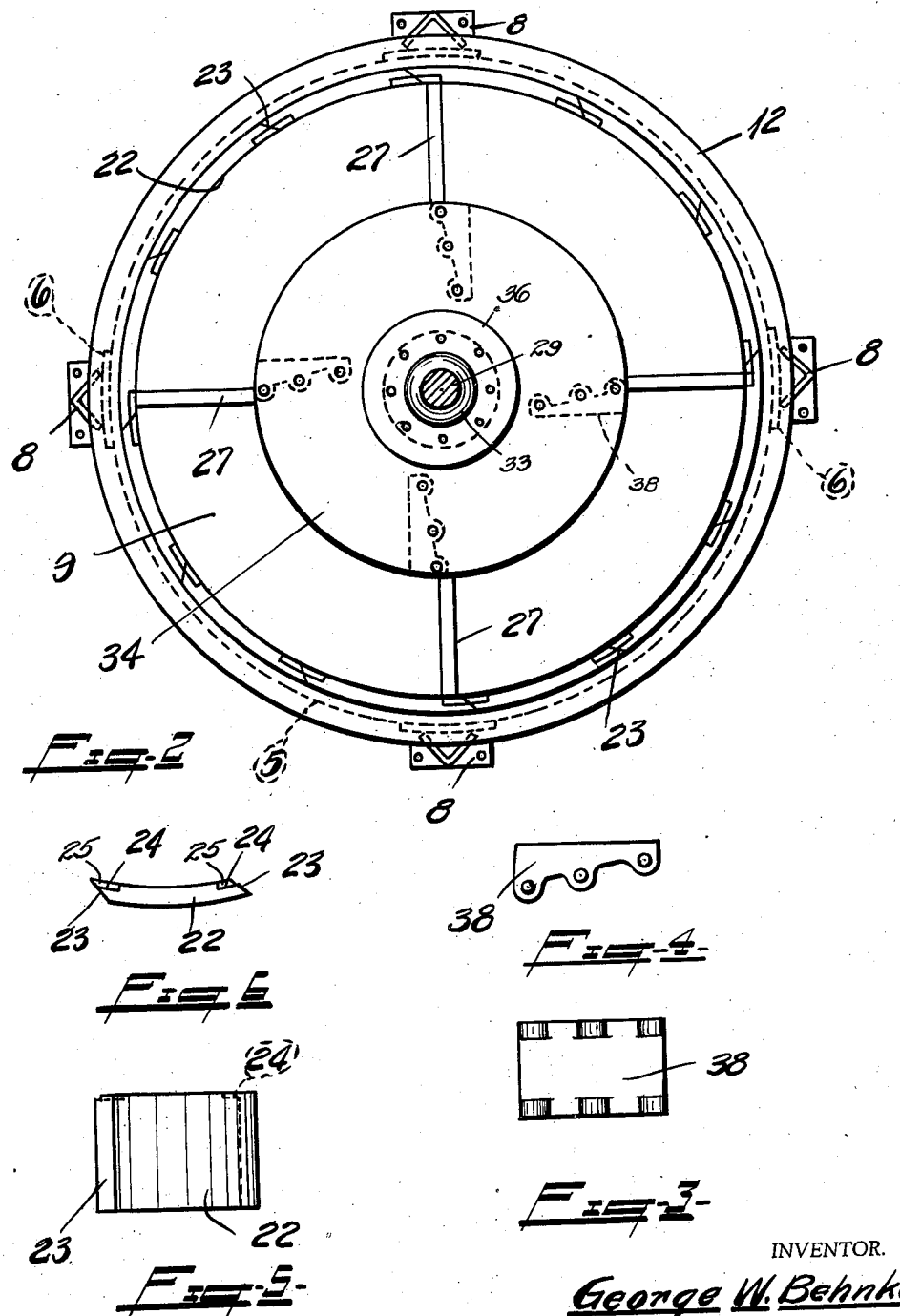
INVENTOR.
George W. Behnke,
BY
Frank C. Searman.
ATTORNEY.

Patented Aug. 20, 1935

2,012,155

UNITED STATES PATENT OFFICE 2,012,155

DISINTEGRATING MACHINE

George W. Behnke, Durand, Mich., assignor to Simplicity Engineering Company, Durand, Mich., a corporation of Michigan Application January 9, 1932, Serial No. 585,668

6 Claims. (Cl. 209—6)

This invention relates to disintegrating machines for reducing materials susceptible to reduction, and more specifically to a machine for crushing and breaking up soft stone, clayballs, and other commercially objectionable foreign matter present in gravel, so that the pulverized soft stone can be separated by screening, and the crushed clayballs and fine particles removed by water.

Another object of the invention is to design a disintegrator provided with a rotor onto which the gravel is fed, and further provide impeller blades for uniformly distributing the material as it is thrown (by centrifugal force) against a smooth surface.

A further object resides in the provision of means for separating the crushed and soft particle from the commercially salable product, and simultaneously wash the good product as the crushed clay and other debris is carried away.

A still further object is to provide quickly detachable shell liner sections, so that these sections can be readily and quickly replaced when worn.

A further object still is to provide covers to facilitate the changing of liners and/or impeller blades, or for the purpose of repair and inspection as occasion demands.

With the above and other objects in view, the present invention consists in the combination and arrangement of parts hereinafter more fully described, illustrated in the accompanying drawings, and particularly pointed out in the appended claims, it being understood that changes may be made in the form, size, proportion, and minor details of construction, without departing from the spirit, or sacrificing any of the advantages of the invention.

In the drawings—

Fig. 1 is a part sectional side view of a disintegrator showing the screen in position.

Fig. 2 is a top plan view taken on the line 2—2 of Fig. 1.

Fig. 3 is a detail side view of one of the impeller blades.

Fig. 4 is a plan view thereof.

Fig. 5 is a side view of one of the liner sections.

Fig. 6 is a top plan view thereof.

Fig. 7 is a plan view of the screen proper

Referring now more particularly to the drawings, the numeral 5 indicates the disintegrator shell. This is preferably cylindrical in shape and is provided with spaced apart plates 6 secured thereto by means of bolts 7, and legs 8 are welded or otherwise secured to each plate.

A hopper-shaped bottom section 9 is secured to the lower end of the shell 5, and clips 10 are secured to the exterior surface thereof, and when the disintegrator is assembled, these clips will be in direct vertical alignment with similar clips 10 provided on the shell, bolts 11 being provided for drawing the clips together to telescope the upper end of the section 9 over the lower end of the shell and detachably secure it in position.

A flange 12 is provided on the upper edge of the shell 5, and a cover 13 is secured thereto by means of bolts 14, a centrally disposed opening 15 being provided in said cover and is adapted to accommodate the lower end of a hopper 16, ribs 17 being formed integral with said cover, the inner ends being angled to accommodate and support said hopper; a plate 18 forms a cover for said hopper, and an opening 19 is provided therein and to which the intake spout (not shown) is connected.

A relatively narrow band 20 is rigidly secured to the lower end of the shell 5 by means of bolts 21, and a smooth faced liner is provided in the upper end thereof, the lower edge resting on said band. This liner comprises a plurality of sections 22, the edges of which are angled as at 23, so that when in assembled relation, the edge of one section overlaps the other, the upper surface of each liner, directly adjacent the side edges, being recessed as shown at 24, and strips 25 serve to lock the liners in position.

A centrally disposed bearing block 26 is provided in the shell and is held in position by means of tie rods 27, a self-aligning bearing 28 being mounted therein, and a vertically disposed shaft 29 is mounted in said bearing, the upper end of the shaft being journaled in a bearing 30 which is mounted on the cover plate 18. A pulley 31 is mounted on the end of the shaft 29 and is driven from any suitable source of power.

The shaft 29 is shouldered at a point intermediate its length as at 32, and a tapered hub 33 is secured thereon, a rotor being mounted on said hub, and comprises vertically spaced plates 34 and 35 respectively, the upper plate having a centrally disposed opening 36 to accommodate the lower end 37 of the intake hopper. Radially disposed detachable impeller blades 38 are interposed between said plates in spaced apart relation, and bolts 39 serve to secure them in proper assembled position.

A perforated pipe coil 40 is provided in the upper end of the discharge hopper and connects to a feed pipe 41 which is in turn connected to any suitable source of supply, a similar coil 42 being provided in the lower end of the hopper, the perforations being so disposed that the spray is directed towards a common center, so that dust will be laid, broken-up clay balls, etc. will be dissolved, and the product will be washed. The upper spray will in turn clean the side walls of the hopper, so that the material will not cling therein.

A suitable gyrating screen assembly 43 is located directly beneath the discharge end of the disintegrator, and is driven from any suitable source of power, said screen being constructed substantially as described in Letters Patent of the United States—No. 1,787,852, granted January 6th, 1931—and I do not deem it necessary to describe this in detail.

Spray pipes 44 are located directly over the screen and are connected to the supply pipe 41, nozzles 45 being provided on said pipes and spray the surface of the screen and the material being fed thereover, so that a clean, washed product of uniform size is provided.

The hopper-shaped bottom section is easily detached, and an opening 46 is also provided in the cover to facilitate inspection or minor repair.

The operation of the device is as follows: The shaft 29 is driven at a certain predetermined R. P. M., the material is then fed through the opening 19 into the feed hopper 6, thence falling onto the rotor plate 34 from which it is thrown by centrifugal force against the smooth liner or side wall of the shell, the spaced impeller plates insuring a uniform flow of the material from the rotor, and it is particularly important that this liner or side wall be smooth in order that the best results may be obtained. The material then falls downwardly into the hopper 9, and any fine material clinging to the hopper side wall is washed free by water from the spray pipe 40, thence the material passes through the spray on the lower end of the hopper which carries away fine sand, crushed and dissolved clay balls, etc., and over the screen 43 where the fine undersized material is screened out, the screened product being thoroughly washed by the spray nozzles 45, so that a uniform, hard, and clean product is secured.

The machine is, of course, of considerable weight, and my construction makes it especially adaptable for shipment in sections, it can be quickly assembled and set up for operation, and all parts are readily accessible for removal, repair, or replacement.

From the foregoing description it will be obvious that I have perfected a very simple, practical, and substantial disintegrating machine for reducing undesirable material susceptible to reduction, and then removing said undesirable materials by washing and screening.

What I claim is:

1. A disintegrating machine of the class described and comprising a cylindrical shell provided with a smooth surfaced, detachable inner liner, a bearing mounted in the shell, an intake hopper mounted on said shell and a bearing mounted thereon, a vertically disposed shaft journaled in said bearings, a horizontally disposed rotor mounted on the lower end of said shaft, a hopper-shaped bottom secured in said shell, and spray pipes mounted on said bottom for directing water onto the material as it passes through the hopper-shaped bottom member.

2. A disintegrating machine of the class described comprising a cylindrical shell provided with a smooth faced sectional and detachable liner, a bearing mounted in the machine, an intake hopper mounted on the shell and a bearing mounted on said hopper, a centrally disposed vertical drive shaft projecting through said hopper and journaled in said bearings, a rotor mounted on the lower end of the shaft and comprising spaced apart plates having impeller blades interposed therebetween, a hopper-shaped bottom secured to said shell, and spray pipes secured to the upper and lower ends of said bottom for dissolving mud balls, laying dust, and spraying the material as it passes through the bottom member.

3. A disintegrating machine of the class described comprising a cylindrical shell provided with a detachable smooth surfaced inner liner, an intake hopper mounted on the shell, a cover forming a closure for the upper end of said hopper, a centrally disposed vertical shaft mounted in said shell and projecting through said intake hopper, a rotor mounted on said shaft and provided with spaced apart outwardly radiating impeller blades, a hopper shaped bottom section secured to said shell, and a spray pipe around the lower end of the hopper section, the spray openings being so disposed as to direct the spray towards a common center to dissolve mud balls and lay dust as the material is discharged.

4. A disintegrating machine of the class described comprising a cylindrical shell provided with a detachable hopper-shaped bottom section, a detachable cover member provided with spaced apart ribs and having a centrally disposed opening therein, a feed hopper detachably mounted on said cover, a centrally disposed shaft projecting through said hopper, a rotor mounted on said shaft and into which the feed hopper extends, a smooth surfaced sectional detachable liner provided in the shell and against which the material is thrown by the rotor member, and a spray pipe surrounding the lower end of the bottom section and adapted to spray the material discharging therethrough to lay the dust and to dissolve soluble matter carried in the material.

5. In a disintegrating machine of the class described comprising a cylindrical shell provided with a hopper-shaped bottom section, legs supporting said shell, a cover forming a closure for the upper end thereof and provided with spaced apart ribs, an opening in said cover, a feed hopper projecting into said cover and centered by said ribs, a cover on said hopper and a bearing mounted thereon, a second bearing in the shell, tie rods supporting said bearing, a vertically disposed shaft journaled in said bearings, a rotor mounted on said shaft directly below the feed hopper, and spaced apart pipes secured to the bottom section for spraying the material as it is discharged from the bottom section and dissolving the soluble material.

6. A disintegrating machine comprising a cylindrical shell having a detachable hopper-shaped bottom section, a ribbed cover forming a closure for the shell, a feed hopper mounted on the cover and projecting into said shell, a bearing mounted on said hopper, a second bearing in the shell, bars supporting said second mentioned bearing, a vertically disposed shaft journaled in said bearings, a rotor mounted thereon, a smooth surfaced sectional liner in the shell and against which the material is thrown, and spaced apart spray pipes mounted on the bottom section for spraying the material as it passes through said section for dissolving the soluble material.

GEORGE W. BEHNKE.